Dec. 18, 1962

D. FIRTH 3,068,665

FLEXIBLE COUPLING

Filed March 9, 1961

INVENTOR.
DAVID FIRTH
BY
M. A. Hobbs
ATTORNEY

Dec. 18, 1962     D. FIRTH     3,068,665
FLEXIBLE COUPLING

Filed March 9, 1961     4 Sheets-Sheet 2

INVENTOR.
DAVID FIRTH
BY
ATTORNEY

INVENTOR.
DAVID FIRTH
BY
ATTORNEY

United States Patent Office 3,068,665
Patented Dec. 18, 1962

3,068,665
FLEXIBLE COUPLING
David Firth, South Bend, Ind., assignor to Dodge Manufacturing Corporation, Mishawaka, Ind., a corporation of Indiana
Filed Mar. 9, 1961, Ser. No. 94,613
17 Claims. (Cl. 64—11)

The present invention relates to couplings and more particularly to flexible couplings for connecting rotatable and axially positioned shafts.

In connecting driver and driven axially aligned shafts, the usual practice is to employ a flexible coupling consisting generally of fittings rigidly secured to the ends of the two shafts and a flexible element of rubber or rubber-like material joined firmly to and yieldably connecting the two fixtures. Conventional couplings of this type have the inherent disadvantages of being incapable of operating effectively and efficiently with substantially angular and parallel misligned shafts or with appreciable end-floating of one or both of the shafts, unless couplings of relatively large diameter and with relatively large flexible elements are employed. These latter couplings have limited application, in that their large size and weight render them impractical for high speed operations in which centrifugal force becomes an important factor. Further, compact couplings now available which give satisfactory performance under adverse and severe operating conditions and meet all installation and service requirements, are more complex, difficult to manufacture and install, and consequently generally more expensive, than the less efficient, less versatile and more unreliable conventional flexible couplings. One of the principal objects of the present invention, therefore, is to provide a relatively simple, compact and economical flexible coupling of substantially smaller diameter than conventional couplings of similar load capacity and of such design and construction that it can accommodate all normal maladjustments between axially aligned driver and driven shafts, including angular misalignment, parallel misalignment and endfloat, and can simultaneously cushion load shock and eliminate or minimize torsional vibration.

In the construction of the conventional flexible couplings, various types of structures have been used to clamp or connect the flexible element to the shaft fixtures. These, however, have involved a number of separate parts which must be assembled at the time the coupling is installed and must be removed and again reassembled whenever the flexible element or coupling is replaced. Further, in order to replace the flexible coupling, it is usually necessary to remove the fixtures from one or both of the shafts and not infrequently displace the motor and/or driven machine from their mounting bases. It is therefore another primary object of the present invention to provide a flexible coupling which can easily be mounted on opposed axially aligned shafts, in difficult to reach locations, and in which all adjustments and members for securing the flexible element to the fixtures and the fixtures to the shaft can be easily reached and maniplated from a position at the side of the shafts, without any interference from the motor or driven machine.

Appreciable difficulty has been encountered in the past in clamping or otherwise securing the flexible element to the shaft fixtures, in that the forces retaining the element on the fixtures are frequently not uniformly or continuously distributed throughout the circumferential margins of the element, or are confined to relatively narrow circumferential areas. This nonuniform distribution of forces forms initial focal points for excess forces which often result in premature failure of the flexible element, thus increasing the operating and maintenance costs of the coupling. Hence, another object is to provide a structure for clamping the flexible element to the shaft fixtures, which applies pressure both radially and axially over a substantial marginal area of the element to clamp the area uniformly with a predetermined pressure to the shaft fixtures.

A further object of the invention is to provide a flexible coupling in which imperforate marginal areas of the element are clamped firmly against radial and axial surfaces by a contractible, readily adjustable ring applying and distributing the clamping pressure evenly throughout the marginal areas.

Another object of the invention is to provide a flexible coupling of the aforesaid type constructed of a few relatively simple, easily fabricated parts, which can be assembled without special tools or equipment at the place of installation, and which can readily be inspected, serviced, and repaired thereafter without the equipment on which the coupling is installed being moved or rendered inoperative for any extended period of time.

Additional objects and advantages of the invention will become apparent from the following description and accompanying drawings, wherein.

Figure 1:
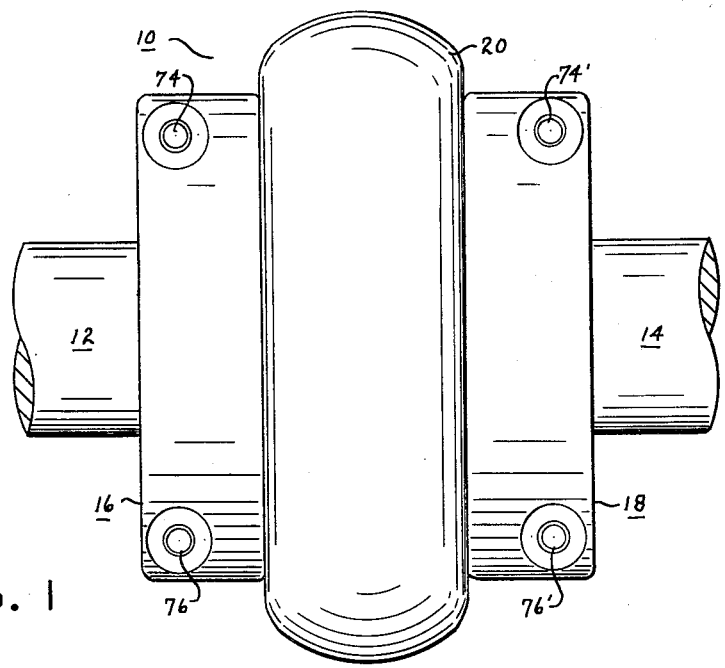
FIGURE 1 is a side elevational view of a flexible coupling embodying my invention and shown mounted in operating position on driver and driven shafts.
Figure 2:
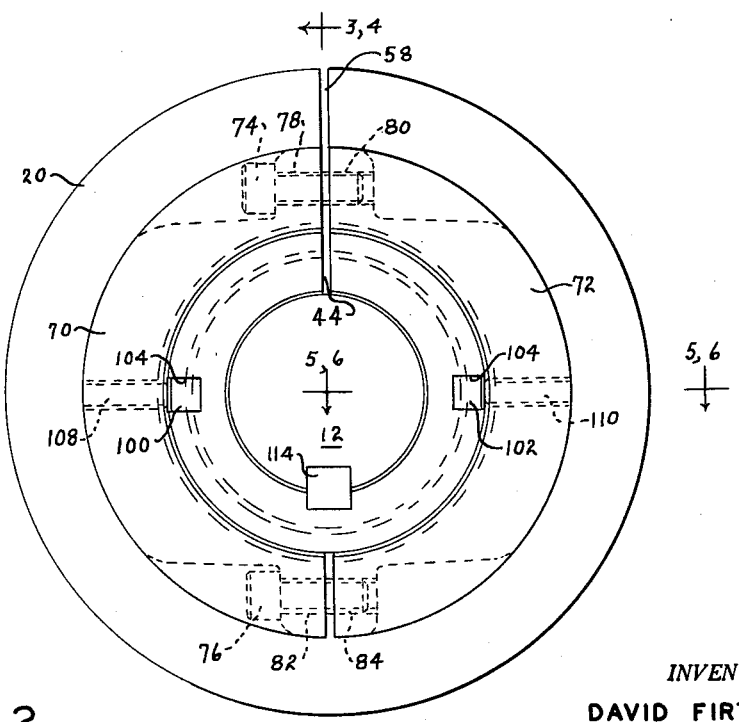
FIGURE 2 is an end elevational view of the coupling shown in FIGURE 1.

With reference to the embodiment of the present invention illustrated in FIGURES 1 through 6, coupling 10 is shown mounted on driver shaft 12 and driven shaft 14 with flange assemblies 16 and 18 of the coupling being secured to the respective shafts and connected to one another by a flexible torsion element 20. The two shafts are in substantial alignment and spaced from one another with driver shaft 12 being, for example, the shaft of an electric motor, internal combustion engine or similar power source, and driven shaft 14 being the power input or drive shaft of one of a number of different types of industrial and commercial machines or vehicles. The shafts shown in the drawings are the same diameter and have conventional key-ways, although the present type of coupling can be readily adapted to driver and driven shafts of different diameters, straight or tapered, and with or without keys and key-ways.

The two flange assemblies 16 and 18 are identical in construction and the parts thereof may be used interchangeably on the driver and driven shafts of the same diameter; consequently, only one of the flange assemblies will be described in detail herein, using in the description the same numerals of one with primes to identify like parts of the other. Flange assembly 16 consists of a hub 30 and an element retaining collar 32, the hub having a cylindrical body portion 34 with a straight longitudinal bore for receiving shaft 12 and an annular flange 36 joined integrally to the inner end of the body portion and extending radially outwardly to form an annular shoulder 40 substantially perpendicular to the axis of the shaft. The external surface 38 of body portion 34 is parallel with the axis of the shaft and terminates at its outer end in an annular abutment 42 joined integrally with the body portion and having an inwardly extending tapered surface for adjustably supporting collar 32 in a manner more fully described hereinafter. Radial surface 40 and axial surface 38 of the of the hub form seats for receiving the inner surface of the flexible element 20 when it is clamped in place by collars 32 and 32'. A radial slot 44 is provided in the hub, extending the full length of body portion 34 and through flange 36 and abutment 42, and is of sufficient width to permit the hub to slide freely onto the shaft and then contract about and firmly engage the external surface thereof when the complete coupling is secured in operative position on the two shafts.

The flexible torsion element 20 consists of an annular body section 50 of arcuate cross section joined to inwardly extending side walls 52 and 52' which terminate at their inner edges in axially extending annular beads 56 and 56', respectively. The torsion member 20 is preferably preformed to the general configuration shown in FIGURES 1 through 6 and is constructed of rubber or rubber-like synthetic material having a plurality of fabric layers 62 of nylon or other suitable material embedded in the body section 50, side walls 52 and 52' and beads 56 and 56'. The body portion, side walls and beads may be of the same thickness throughout; however, for some installations, particularly for heavy duty requirements, it may be desirable to increase the thickness of either the side walls or the flanges or both and to include a hard core in the flanges around which the ends of the fabric layers are wrapped. To permit the element to be easily assembed onto the two flange assemblies 16 and 18 and to be readily replaced during service, the element is split as shown at numeral 58, thus permitting the ends on either side of the split to be separated and the element placed around the flange assemblies with radial flanges 36 and 36' between the two side walls 52 and 52'.

Figure 3:
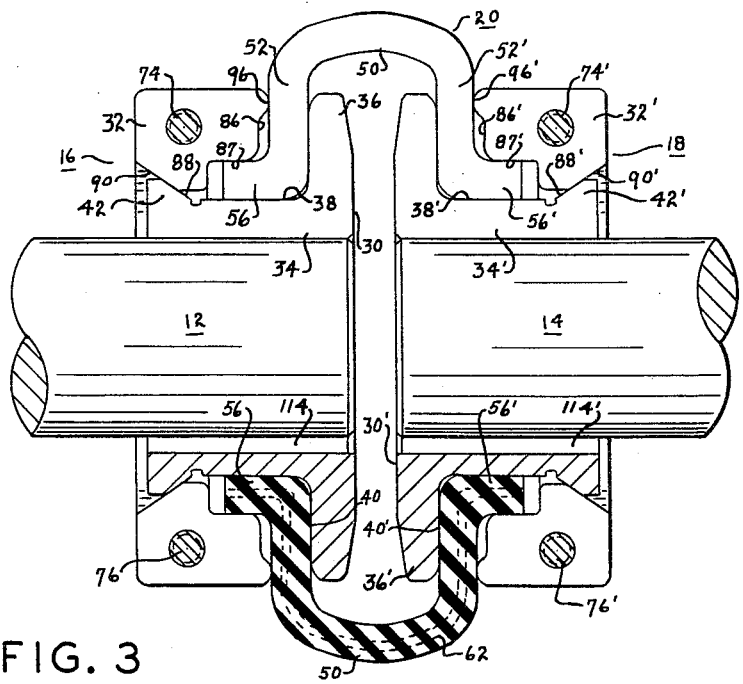
FIGURE 3 is a longitudinal cross sectional view of the coupling shown in the preceding figures, taken on line 3—3 of FIGURE 2 and showing the flexible element of the coupling before it is clamped in operating position.
Figure 4:
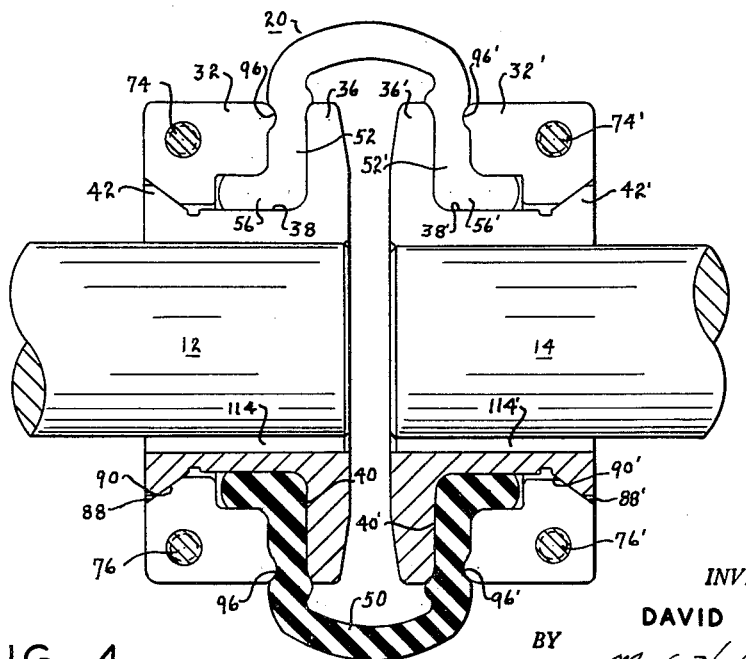
FIGURE 4 is a longitudinal cross sectional view of the coupling similar to that of FIGURE 3, showing the flexible element after it has been clamped in operating position.
Figure 5:
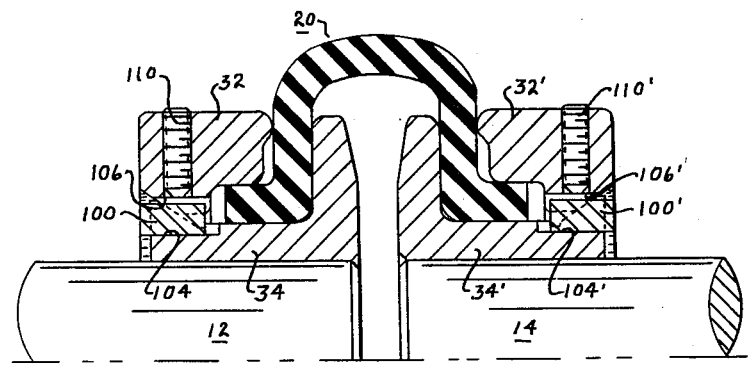
FIGURE 5 is a partial longitudinal cross sectional view of the present coupling taken on line 5—5 of FIGURE 2, and showing another view of the flexible element of the coupling before it is clamped in operating position.
Figure 6:
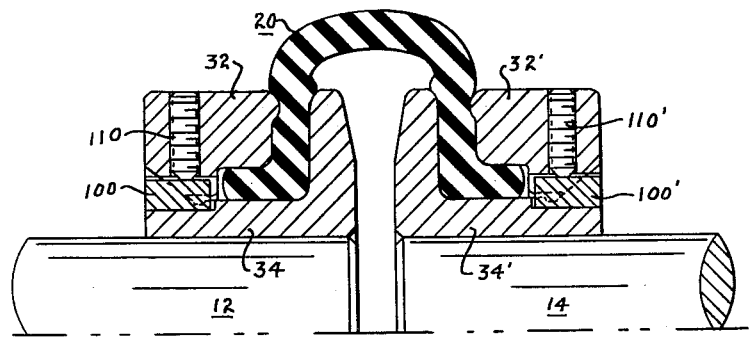
FIGURE 6 is a partial longitudinal cross sectional view of the coupling similar to that of FIGURE 5, showing another view of the flexible element after it has been clamped in operating position.

Torsion element 20 is assembled on hubs 30 and 30' in the manner shown in FIGURE 3 with side walls 52 and 52' engaging radial surfaces 40 and 40', and beads 56 and 56' seated on external surfaces 38 and 38', respectively, and is firmly clamped against those surfaces, in the manner shown in FIGURE 4, by segmented collars 32 and 32'. Collar 32 consists of two segments 70 and 72 secured together by socket head screws 74 and 76, the former extending through unthreaded bore 78 of segment 70 into threaded bore 80 of segment 72 and the latter extending through unthreaded bore 82 of segment 70 into threaded bore 84 of segment 72. While each segment is substantially a full semi-circle, sufficient spacing is provided at each end of the two segments to permit the clamping surfaces 86 and 87 of the collar to engage and firmly compress the side walls and beads of the flexible element when the two screws are tightened.

Surface 88 of annular abutment 42 is tapered inwardly and toward the center providing a frusto-conical seat for a corresponding internal surface 90 of collar 32, the angle of the tapered surface with respect to the axis of the hub preferably being forty-five degrees; however, other angles can be used satisfactorily. When the two segments 70 and 72 are first assembled to form collar 32 with screws 74 and 76 retaining the two segments loosely together, the collar is in its expanded position with surface 90 resting on the outer margin of surface 88, as shown in FIGURE 3. Thereafter, tightening the two screws contracts the collar, moving it inwardly and axially along tapered surface 88 and causing clamping surface 86 to move axially against element side wall 52 and surface 87 to move radially inwardly against bead 56. This action clamps side wall 52 against radial surface 40 and bead 56 against hub surface 38, thus axially and radially clamping the torsion element firmly and uniformly over a relatively wide marginal area of the element. A peripheral protrusion 96 is preferably provided on surface 86 in order to increase the clamping action of collar 32 adjacent the peripheral edge of annular flange 36.

In order to prevent relative rotation between the hubs and respective collars and to lock the collars in place after the element clamping operation has been completed, inserts 100 and 102 are seated in aligned slots 104 and 106 of the hub and collar segments and retained therein by set screws 108 and 110. After the set screws have been tightened, the collars are held rigidly in place and will not become loose or move relative to the hubs, throughout the operation of the coupling, regardless of shaft and coupling vibration and changes in the physical conditions of the flexible element.

In assembling the present coupling in operating position on shafts 12 and 14, hubs 30 and 30' are slipped into the ends of the respective shafts with keys 114 and 114' in their key ways. The split torsion element is placed around the two hubs with side walls 52 and 52' against radial surfaces 40 and 40' and beads 56 and 56' against external surfaces 38 and 38', and the two collars are then assembled around the hubs in contact with abutments 42 and 42' in the manner shown in FIGURES 3 and 5. Screws 74 and 76 of collar 32 and screws 74' and 76' of collar 32' are tightened, clamping the marginal areas of the torsion element and simultaneously contracting and securing the hubs to the shafts. Set screws 108 and 110 are then tightened to lock the collars in the final adjusted position and the hubs firmly on the respective shafts.

Figure 7:
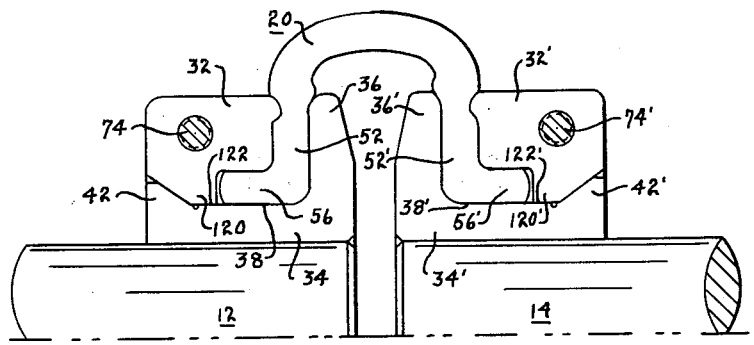
FIGURE 7 is a partial longitudinal cross sectional view of a modified form of the present flexible coupling.

The modified form of the invention illustrated in FIGURE 7 is similar in construction and operation to the embodiment previously described; however, in this form collars 32 and 32' extend inwardly toward the respective hub at the portion indicated at numerals 120 and 120'. The hubs, flexible element and collars are assembled in the same manner as in the previous embodiment, and the collars are tightened by the respective screws to clamp the marginal portions of the element against the hubs and radial flanges 36 and 36'. In this embodiment the screws are tightened until surfaces 122 and 122' contact external surfaces 38 and 38' of the two hubs, thereby limiting the degree to which the margins of the flexible element are compressed by the collars, and simultaneously applying sufficient pressure onto the periphery of the hubs to contact and secure them firmly on to their respective shafts.

Figure 8:
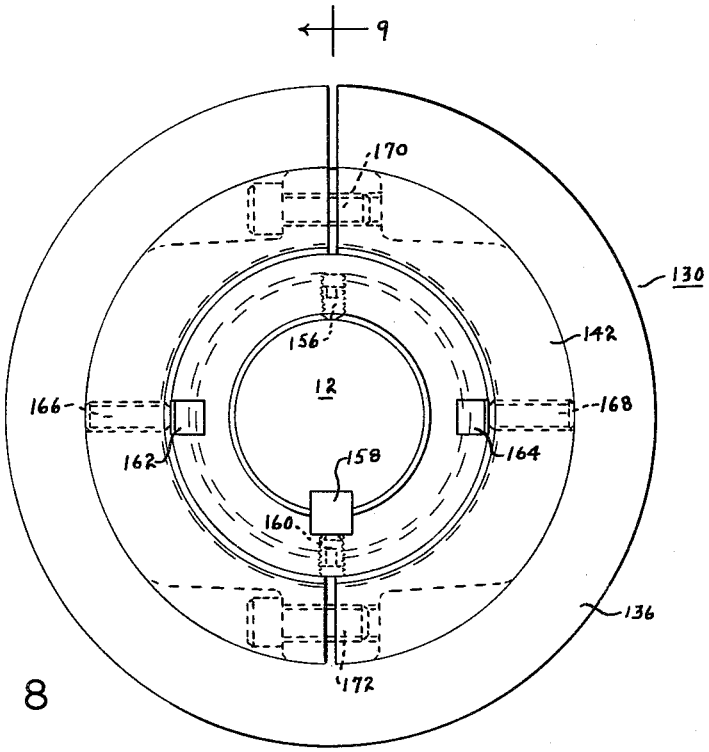
FIGURE 8 is an end elevational view of a further modified form of the present flexible coupling.
Figure 9:
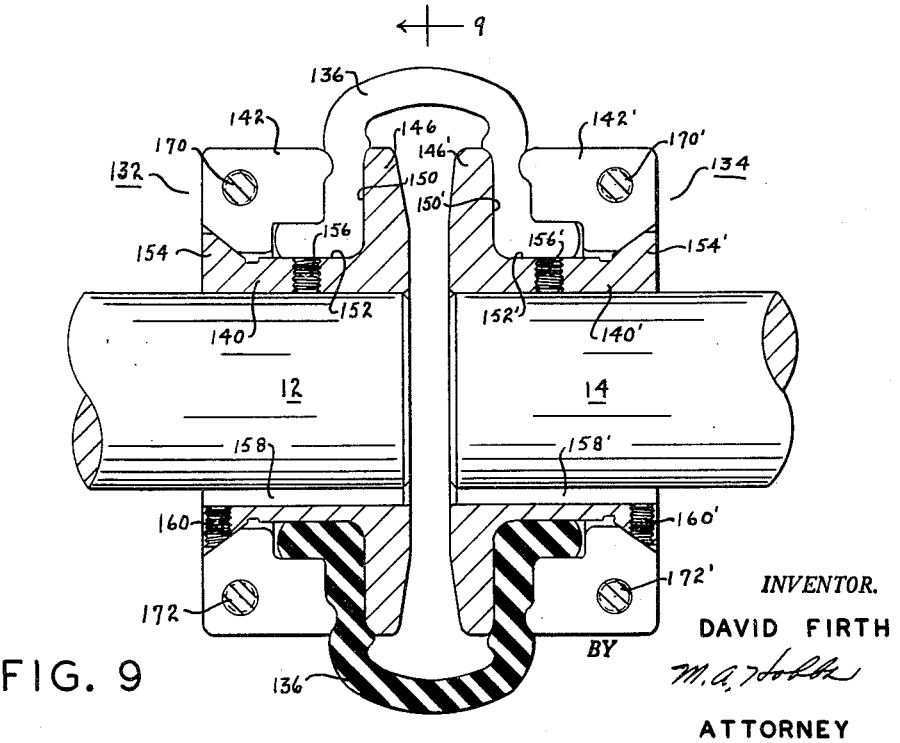
FIGURE 9 is a longitudinal cross sectional view of the coupling shown in FIGURE 8, taken on line 9—9 of the latter figure.

A further modified form of the invention is shown in FIGURES 8 and 9, wherein numeral 130 designates the coupling mounted on shafts 12 and 14, and numerals 132 and 134 indicate flange assemblies and 136 the flexible element connecting the two flange assemblies. Flange assembly 132 consists of a hub 140 and an element retaining collar 142, the hub having a cylindrical body portion with a straight longitudinal bore for receiving shaft 12, and an annular flange 146 joined integrally to the inner body portion and extending radially outwardly to form an annular shoulder 150 substantially perpendicular to the axis of the shaft. The external surface 152 of the body portion is parallel with the axis of the shaft and terminates at its outer end in an annular abutment 154 joined integrally with the body portion and having an inwardly extending tapered surface for adjustably supporting collar 142 in the manner described with reference to the previous embodiment. The hub is circumferentially continuous, i.e. not split, and is secured in place on the shaft by a set screw 156 seated in a threaded hole in the body portion of the hub. A key 158 is also preferably employed and is retained in place by a set screw 160 seated in a threaded hole in abutment 154.

In order to lock the collars in place after the element clamping operation has been completed, inserts 162 and 164 are seated in aligned slots of the hub and collar segments and retained therein by set screws 166 and 168. The flexible torsion element 136 is identical in construction and operation to element 20, and the two collars 142 and 142′ are identical to collars 32 and 32′, the segments thereof being retained together by screws 170 and 172 in the former and screws 170′ and 172′ in the latter. Aside from the tightening of set screws 156, 156′, 160, 160′ in the hubs, the coupling of this modification is installed in the same manner as the coupling shown in FIGURES 1 through 6.

While three variations of the present invention have been described in detail herein, further changes and modifications may be made without departing from the scope of the present invention.

I claim:

1. A flexible coupling for connecting axially aligned driver and driven shafts, comprising a longitudinally split torsion element of rubber-like material with centrally projecting side walls and laterally projecting beads on the inner edges of said walls, flanges for connecting said element to the shafts, each flange having a longitudinally split hub with a cylindrical external surface and with a radially extending annular member on the inner end and an abutment on the outer end, said abutment having an annular surface tapered inwardly and toward the center at a forty-five degree angle, two substantially semi-circular segments forming a collar having a radial surface for engaging one wall of said element and an inner circumferential surface for engaging the bead on said one side wall and having a tapered internal surface corresponding to and engaging the tapered surface on said abutment, screws connecting said segments for contracting said collar and thereby clamping said side wall against said radial member and said bead against said cylindrical surface, aligned slots in said hub and collar, a key in said slots, and a set screw extending through said collar and engaging said key.

2. A flexible coupling for connecting axially aligned driver and driven shafts, comprising an annular flexible torsion element with centrally projecting side walls and laterally projecting beads on the inner edges of said walls, flanges for connecting said element to the shafts, each flange having a longitudinally split hub with a cylindrical external surface and with a radially extending annular member on the inner end and an abutment on the outer end, said abutment having an annular surface tapered inwardly and toward the center, a segmented collar having a radial surface for engaging one wall of said element and an inner circumferential surface for engaging the bead on said one side wall and having a tapered internal surface corresponding to and engaging the tapered surface on said abutment, screws connecting the segments for contracting said collar and thereby clamping said side wall against said radial member and said bead against said cylindrical surface, aligned slots in said hub and collar, and a key in said slots.

3. A flexible coupling for connecting axially aligned driver and driven shafts, comprising a longitudinally split torsion element of rubber-like material with centrally projecting side walls and laterally projecting beads on the inner edges of said walls, flanges for connecting said element to the shafts, each flange having a longitudinally split hub with a cylindrical external surface and with a radially extending annular member on the inner end and an abutment on the outer end, said abutment having a surface tapered inwardly and toward the center, a segmented collar having a radial surface for engaging one wall of said element and an inner circumferential surface for engaging the bead on said one side wall and having a tapered internal surface corresponding to and engaging the tapered surface on said abutment, and screws connecting the segments for contracting said collar and thereby clamping said side wall against said radial member and said bead against said cylindrical surface.

4. A flexible coupling for connecting two rotatable shafts in end-to-end relation, comprising an annular flexible torsion element with centrally projecting side walls and laterally projecting beads on the inner edges of said walls, flanges for connecting said element to the shafts, each flange having a longitudinally split hub with a cylindrical external surface and with a radially extending annular member on the inner end and an abutment on the outer end, said abutment having a surface tapered inwardly and toward the center, a segmented collar having a radial surface for engaging one wall of said element and an inner circumferential surface for engaging the bead on said one side wall and having a tapered internal surface corresponding to and engaging the tapered surface on said abutment, and means connecting the segments for contracting said collar and thereby clamping said side wall against said radial member and said bead against said cylindrical surface.

5. A flexible coupling for connecting two rotatable shafts in end-to-end relation, comprising a longitudinally split torsion element of rubber-like material with centrally projecting side walls and laterally projecting beads on the inner edges of said walls, flanges for connecting said element to the shafts, each flange having a longitudinally split hub with a cylindrical external surface and with a radially extending annular member on the inner end and an abutment on the outer end, said abutment having an annular surface tapered inwardly and toward the center, two substantially semi-circular segments forming a collar having a radial surface for engaging one wall of said element and an inner circumferential surface for engaging the bead on said one side wall and having a tapered internal surface corresponding to and engaging the tapered surface on said abutment, screws connecting the segments for contracting said collar and thereby clamping said side wall against said radial member and said bead against said cylindrical surface, aligned slots in said hub and collar, a key in said slots, and a set screw extending through said collar and engaging said key.

6. A flexible coupling for connecting two rotatable shafts in end-to-end relation, comprising an annular flexible torsion element with centrally projecting side walls and laterally projecting beads on the inner edges of said walls, flanges for connecting said element to the shafts, each flange having a hub with a cylindrical external surface and with a radially extending annular member on the inner end and an abutment on the outer end, said abutment having a surface tapered inwardly and toward the center, a segmented collar having a radial surface for engaging one wall of said element and an inner circumferential surface for engaging the bead on said one side wall and having a tapered internal surface corresponding to and engaging the tapered surface on said abutment, and means connecting the segments for contracting said collar and thereby clamping said side wall against said radial member and said bead against said cylindrical surface.

7. A flexible coupling for connecting two shafts in end-to-end relation, comprising an annular flexible torsion element with centrally projecting side walls and laterally projecting beads on the inner edges of said walls, flanges for connecting said element to the shafts, each flange having a hub with a cylindrical external surface and with a radially extending annular member on the inner end, a segmented collar having a radial surface for engaging one wall of said element and an inner circumferential surface for engaging the bead on said one side wall, and means connecting the segments for contracting said collar and thereby clamping said side wall against said radial member and said bead against said cylindrical surface.

8. A flexible coupling for connecting two shafts in end-to-end relation, comprising an annular flexible torsion element, flanges for connecting said element to the shafts, each flange having a hub with an abutment on the outer end, said abutment having an annular surface tapered inwardly and toward the center, a segmented collar having a tapered internal surface corresponding to and engaging the tapered surface on said abutment, screws connecting the segments for contracting said collar and thereby clamping said element against said hub, aligned slots in said hub and collar, a key in said slots, and a set screw extending through said collar and engaging said key.

9. A flexible coupling for connecting two shafts in end-to-end relation, comprising an annular flexible torsion element, flanges for connecting said element to the shafts, each flange having a hub wtih an abutment, said abutment having a surface tapered inwardly and toward the center, a segmented collar having an internal surface engaging the tapered surface on said abutment, and means connecting the segments for contracting said collar and thereby clamping said element against said hub.

10. A flexible coupling for connecting axially aligned driver and driven shafts, comprising an annular flexible torsion element with centrally projecting side walls and laterally projecting beads on the inner edges of said walls, flanges for connecting said element to the shafts, each flange having a hub with a cylindrical external surface and with a radially extending annular member on the inner end and an abutment on the outer end, said abutment having a surface tapered inwardly and toward the center, a set screw extending through the hub for securing the hub to the shaft, a segmented collar having a radial surface for engaging one wall of said element and an inner circumferential surface for engaging the bead on said one side wall and having a tapered internal surface corresponding to and engaging the tapered surface on said abutment, and screws connecting the segments for contracting said collar and thereby clamping said side wall against said radial member and said bead against said cylindrical surface.

11. A flexible coupling for connecting two shafts in end-to-end relation, comprising an annular flexible torsion element, flanges for connecting said element to the shafts, each flange having a hub with an abutment, said abutment having a surface tapered inwardly and toward the center, a means extending through the hub for securing the hub to the shaft, a segmented collar having an internal surface engaging the tapered surface on said abutment, and means connecting the segments for contracting said collar and thereby clamping said element against said hub.

12. In a flexible coupling for connecting two shafts in end-to-end relation: a longitudinally split hub comprising a cylindrical body portion having at one end a radially extending annular member and at the other end an abutment with an annular surface tapered inwardly and toward the center, and an expandable and contractible collar around said hub having a tapered internal surface coresponding to and engaging the tapered surface on said abutment.

13. In a flexible coupling for connecting two shafts in end-to-end relation: a hub comprising a cylindrical body portion having at one end a radially extending annular member and at the other end an abutment with a surface tapered inwardly and toward the center, and an expandable and contractible collar around said hub having an internal surface engaging the tapered surface on said abutment.

14. A hub for a coupling, comprising a hollow cylindrical body portion having at one end a radially extending annular member and an abutment on the external surface of the body spaced from said annular member and having an annular surface tapered toward the center and said annular member, said body portion, annular member and abutment being split longitudinally throughout the length of the hub.

15. In a flexible coupling for connecting two shafts in end-to-end relation: a hub comprising a cylindrical metal body portion having at one end a radially extending substantially rigid annular member and at the other end an abutment on the external surface facing said annular member and having a surface tapered inwardly and toward the center.

16. A flexible coupling for connecting two shafts in end-to-end relation, comprising an annular flexible torsion element with centrally projecting side walls and laterally projecting beads on the inner edges of said walls, flanges for connecting said element to the shafts, each flange having a hub with a cylindrical external surface and with a radially extending annular member on the inner end, an expandable and contractible collar having a radial surface for engaging one wall of said element and an inner circumferential surface for engaging the bead on said one side wall, means on said hub engaged by said collar for limiting the contraction of said collar, and means for contracting said collar and thereby clamping said side wall against said radial member and said bead against said cylindrical surface.

17. In a flexible coupling for connecting two shafts in end-to-end relation: a longitudinally split hub comprising a cylindrical body portion having at one end a radially extending annular member and at the other end an abutment with an annular surface tapered inwardly and toward the center, and an expandable and contractible collar around said hub having a tapered internal surface corresponding to and engaging the tapered surface on said abutment, said collar and hub having internal and external surfaces, respectively, in contact with one another when said collar is contracted.

References Cited in the file of this patent
UNITED STATES PATENTS

| | | |
|---|---|---|
| 899,754 | Murray | Sept. 29, 1908 |
| 987,683 | Allan | Mar. 21, 1911 |
| 2,295,316 | Yates | Sept. 8, 1942 |
| 2,558,589 | Skolfield | June 26, 1951 |
| 2,648,958 | Schlotmann | Aug. 18, 1953 |
| 2,773,365 | Delf et al. | Dec. 11, 1956 |